O. DAVIS.

Sash-Balance.

No. 6,334. Reissued March 16, 1875.

Witnesses.

S. Hanbeck

S. W. Roop

Inventor

Obadiah Davis

THE GRAPHIC CO. PHOTO-LITH. 39 & 41 PARK PLACE, N.Y.

UNITED STATES PATENT OFFICE.

OBADIAH DAVIS, OF BATTLE CREEK, MICHIGAN.

IMPROVEMENT IN SASH-BALANCES.

Specification forming part of Letters Patent No. 154,587, dated September 1, 1874; reissue No. 6,334, dated March 16, 1875; application filed November 2, 1874.

*To all whom it may concern:*

Be it known that I, OBADIAH DAVIS, of Battle Creek, in the county of Calhoun and State of Michigan, have invented a new and valuable Improvement in Sash-Balances; and I do hereby declare that the following is a full, clear, and exact description of the construction and operation of the same, reference being had to the annexed drawings, making a part of this specification, and to the letters and figures of reference marked thereon.

Figure 1:
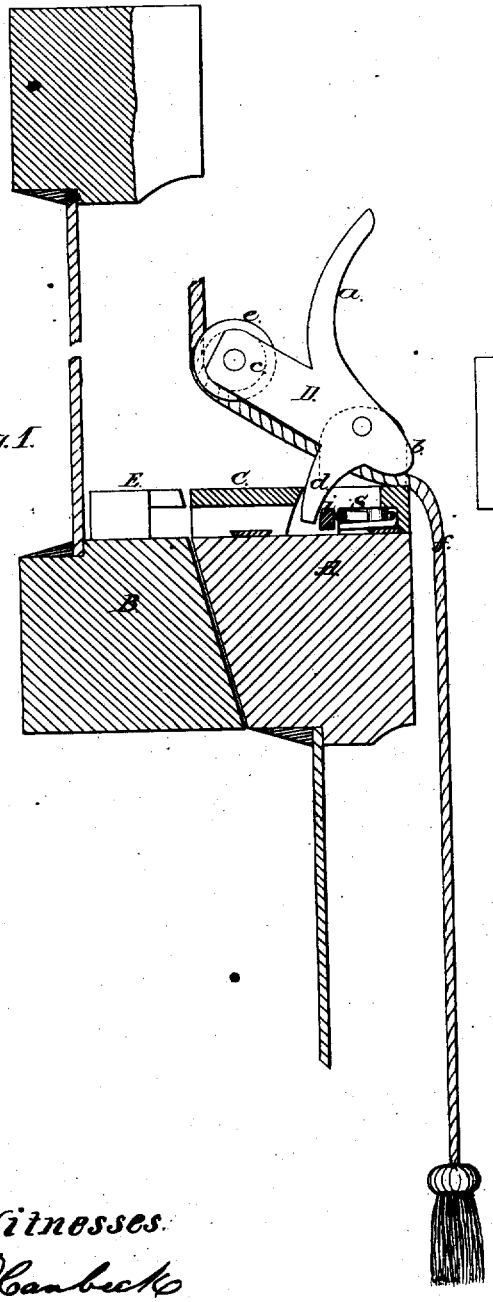
Figure 2:
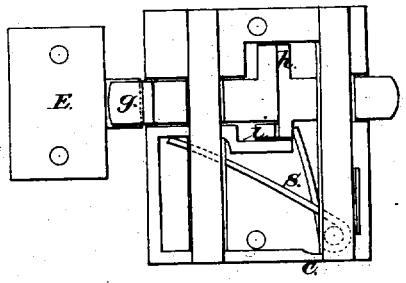
Figure 3:
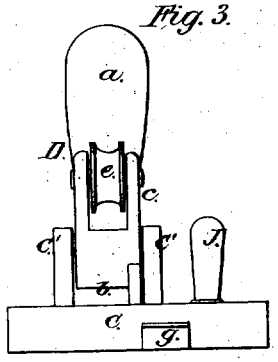

Figure 1 of the drawing is a representation of a vertical sectional view of my sash-balance. Fig. 2 is a plan view, and Fig. 3 is a front view, of the same.

This invention has relation to sash balances and locks; and it consists of a clamping-dog, composed of a griping portion, a finger portion, with or without a portion containing an anti-friction pulley operated on by the sash-cord, and a tongue, combined with a locking-bolt and an operating-spring, whereby the sash-cord is released from the action of the griping portion of the said dog at the same time that the bolt is retracted by the tongue, as will be hereinafter more fully explained.

In the annexed drawings, A designates the upper rail of the lower sash, and B is the lower rail of upper sash. C designates a lock-case, which is secured upon the rail A at or near the middle of its length, in which case works a lock-bolt, *g*, which serves, in connection with a catch, E, on the rail B, to lock this rail to the rail A when they are brought together. The bolt *g* has an offset, *h*, on one side of it, from which a handle, J, rises, and is allowed free play in a slot made through the case C. By means of this handle J a person can retract the bolt and release the sashes, and by means of a spring, S, the bolt is shot out, so that it will engage automatically with its catch E. D designates a dog, which is pivoted between two ears, C′ C′, cast on top of the case C, and which is constructed with a curved finger-piece, *a*, a griping portion, *b*, an arm, *c*, with or without an anti-friction pulley, *e*, but preferably using it, and a tongue, *d*. The latter portion—to wit, the tongue *d*—passes down through the case C, and acts through the medium of the lug *i* on the bolt *g*. The upward pressure of the suspension-cord *f* on the pulley *e* holds the dog D in the position shown in Fig. 1, in which position the same cord *f*, by its upward pressure on the pulley *e*, is griped and firmly held by the portion *b*. The cord *f* passes beneath the portion *b*, thence up and usually beneath the anti-friction pulley *e*, and is fastened to the sash B, after passing over a pulley applied to the heading of the window-frame.

By pressing the finger-piece *a* of the dog D forward the suspension-cord *f* will be released, and the sash may be raised or lowered. At the same time the cord *f* is released as stated, the bolt *g* will be retracted from its catch E by the action of the tongue *d* on the lug *i*.

Having thus fully described my invention, what I claim as new, and desire to secure by Letters Patent, is—

The dog D, with or without anti-friction pulley *e*, and having tongue *d*, finger-piece *a*, and griping portion *b*, in combination with the locking-bolt *g* and spring S, all constructed, arranged, and operating substantially as described and shown, for the purpose set forth.

OBADIAH DAVIS.

Witnesses:
E. HARBECK,
S. W. ROOT.